United States Patent
Cai et al.

(10) Patent No.: US 8,619,601 B2
(45) Date of Patent: Dec. 31, 2013

(54) PROXIMITY OF USER EQUIPMENT TO A HOME LOCAL NETWORK

(75) Inventors: Zhijun Cai, Euless, TX (US); Gordon Peter Young, Warwickshire (GB); Takashi Suzuki, Ichikawa (JP); Wei Wu, Coppell, TX (US); James Earl Womack, Bedford, TX (US)

(73) Assignee: BlackBerry Limited, Waterloo, Ontario (CA)

( * ) Notice: Subject to any disclaimer, the term of this patent is extended or adjusted under 35 U.S.C. 154(b) by 719 days.

(21) Appl. No.: 11/868,000

(22) Filed: Oct. 5, 2007

(65) Prior Publication Data

US 2009/0093234 A1 Apr. 9, 2009

(51) Int. Cl.
| | |
|---|---|
| *H04L 12/28* | (2006.01) |
| *H04W 4/00* | (2009.01) |
| *H04W 24/00* | (2009.01) |

(52) U.S. Cl.
USPC ......... 370/252; 370/332; 455/433; 455/456.2

(58) Field of Classification Search
None
See application file for complete search history.

(56) References Cited

U.S. PATENT DOCUMENTS

| | | | | |
|---|---|---|---|---|
| 5,684,859 A | * | 11/1997 | Chanroo et al. | 455/433 |
| 5,963,866 A | * | 10/1999 | Palamara et al. | 455/456.5 |
| 6,353,739 B1 | * | 3/2002 | Davis | 455/428 |
| 7,136,644 B2 | * | 11/2006 | Hull | 455/432.1 |
| 7,503,489 B2 | * | 3/2009 | Heffez et al. | 235/382 |
| 7,596,385 B2 | * | 9/2009 | Aghvami et al. | 455/552.1 |
| 7,675,846 B2 | | 3/2010 | Lindoff et al. | |
| 2002/0059453 A1 | * | 5/2002 | Eriksson et al. | 709/238 |
| 2003/0055922 A1 | * | 3/2003 | Kim et al. | 709/220 |
| 2003/0100309 A1 | * | 5/2003 | Hull | 455/450 |
| 2003/0118015 A1 | | 6/2003 | Gunnarsson et al. | |
| 2003/0228890 A1 | | 12/2003 | Falaki | |
| 2004/0039817 A1 | | 2/2004 | Lee et al. | |
| 2004/0259546 A1 | * | 12/2004 | Balachandran et al. | 455/435.2 |
| 2005/0277416 A1 | | 12/2005 | Tolli et al. | |
| 2006/0148487 A1 | | 7/2006 | Kim et al. | |
| 2006/0166699 A1 | * | 7/2006 | Aghvami et al. | 455/552.1 |
| 2006/0223557 A1 | | 10/2006 | Manohar | |
| 2007/0149226 A1 | | 6/2007 | de Vries | |
| 2007/0207824 A1 | | 9/2007 | Bhattacharjee et al. | |

(Continued)

FOREIGN PATENT DOCUMENTS

| | | |
|---|---|---|
| DE | 102005022762 A1 | 11/2006 |
| EP | 1467582 A1 | 2/2004 |

(Continued)

OTHER PUBLICATIONS

Mukherjee et al. , U.S. Appl. No. 60/915,078, filed Apr. 30, 2007.*

(Continued)

*Primary Examiner* — Gregory Sefcheck
(74) *Attorney, Agent, or Firm* — Conley Rose, P.C.; J. Robert Brown, Jr.

(57) ABSTRACT

A system is provided that includes a user equipment configured to attempt a measurement of a signal quality from a home local network only when the user equipment is within range of the home local network. A method is also provided for determining when to measure signal quality of the home local network. The method includes measuring a signal quality from the home local network only when the method determines the user equipment is within range of the home local network.

13 Claims, 5 Drawing Sheets

(56) References Cited

U.S. PATENT DOCUMENTS

| | | | |
|---|---|---|---|
| 2008/0102880 A1 | 5/2008 | Gholmieh et al. | |
| 2008/0267114 A1* | 10/2008 | Mukherjee et al. | 370/315 |
| 2009/0092107 A1* | 4/2009 | Cai et al. | 370/338 |

FOREIGN PATENT DOCUMENTS

| | | |
|---|---|---|
| EP | 1827047 A1 | 8/2007 |
| WO | 2004025983 A1 | 3/2004 |
| WO | 2005064970 A1 | 7/2005 |
| WO | 2006100653 A2 | 9/2006 |
| WO | 2007103822 A2 | 9/2007 |

OTHER PUBLICATIONS

Mukherjee et al., U.S. Appl. No. 60/940,557, filed May 29, 2007.*
Cai, Zhijun, et al.; U.S. Appl. No. 11/868,879; Titled: "Inter-Radio Access Technology Measurement System and Method"; filed Oct. 8, 2007; Specification—24 pgs.; 6 Drawing Sheets (Figures 1-7).
EP Search and Examination Report; EP Application No. EP07120826; Feb. 12, 2008; 9 pgs.
Cai, Zhijun, et al.; U.S. Appl. No. 11/869,437; Titled: "System and Method for Inter-Radio Access Technology Signal Measurement"; filed Oct. 9, 2007; Specification—29 pgs.; 6 Drawing Sheets (Figures 1-7).
European Search Report; EP Application No. 08100820.3; Aug. 4, 2008; 7 pgs.
European Communication; EP Application No. EP07120826.8; Oct. 13, 2009; 1 pg.
European Search Report; EP Application No. 08100007.7; May 14, 2008; 7 pgs.
Second European Examination Report; EP Application No. 08100007.7; May 28, 2009; 4 pgs.
Summons to Attend Oral Proceedings, EP Application 08100007.7, Mar. 9, 2010, 4 pgs.
Huawei; 3GPP TSG-RAN Working Group 4 (Radio) meeting #44; Title: "Considerations on Gap Design for Gap-assisted Measurements"; R4-071181; Athens, Greece; Aug. 20-24, 2007; 2 pgs.
Nokia Siemens Networks, Nokia; 3GPP TSG-RAN WG4 Meeting #43bis; Title: "Measurement Gap Creation"; R4-070927; Orlando, Florida; Jun. 25-29, 2007; 4 pgs.
Office Action dated Jun. 17, 2010, 14 pages, U.S. Appl. No. 11/868,879, filed Oct. 8, 2007.
Office Action dated Jun. 16, 2010, 25 pages, U.S. Appl. No. 11/869,437, filed Oct. 9, 2007.
Brief Communication, EP Application No. 08100007.7; Jun. 8, 2010; 1 pg.
Nokia Siemens Networks, Nokia; 3GPP TSG-RAN WG2 Meeting #59; Title: "Measurement Gap Creation"; R2-073397; Athens, Greece; Aug. 20-24, 2007; 5 pgs.
European Search and Examination Report; EP Application No. EP10190383.9; Feb. 17, 2011; 9 pgs.
Notice of Allowance dated Feb. 18, 2011, 13 pages, U.S. Appl. No. 11/868,879, filed Oct. 10, 2007.
Advisory Action dated Feb. 24, 2011, 8 pages, U.S. Appl. No. 11/869,437, filed Oct. 9, 2007.
Third European Search Report; EP Application No. EP07120826.8; Aug. 2, 2011; 7 pgs.
Notice of Allowance dated Jun. 20, 2011, 10 pages, U.S. Appl. No. 11/868,879, filed Oct. 10, 2007.
Notice of Allowance dated Aug. 11, 2011, 9 pages, U.S. Appl. No. 11/869,437, filed Oct. 9, 2007.
European Extended Search Report; Application No. 11185841.1; Nov. 22, 2011; 11 pages.
Canadian Office Action; Application No. 2,639,809; Oct. 13, 2011; 4 pages.
Cai, Zhijun, et al.; U.S. Appl. No. 13/271,985; Titled: "System and Method for Inter-Radio Access Technology Signal Measurement"; filed Oct. 12, 2011.
Canadian Office Action; Application No. 2,639,808; Oct. 27, 2011; 3 pages.
European Extended Search Report; Application No. 11189921.7; Feb. 2, 2012; 7 pages.
European Examination Report; Application No. 07120826.6; Feb. 20, 2012; 4 pages.
Office Action dated Feb. 28, 2012; U.S. Appl. No. 13/271,945, filed Oct. 12, 2011; 27 pages.
Cai, Zhijun, et al.; U.S. Appl. No. 13/271,945, filed Oct. 12, 2011; Title: "Inter-Radio Access Technology Measurement System and Method".
Cai, Zhijun, et al.; U.S. Appl. No. 13/613,1795, filed Sep. 13, 2012; Title: "Inter-Radio Access Technology Measurement System and Method".
European Intent to Grant; Application No. 07120826.8; Aug. 9, 2012; 8 pages.
European Extended Search Report; Application No. 11189922.5; May 22, 2012; 8 pages.
European Extended Search Report; Application No. 11189923.5; May 22, 2012; 8 pages.
Notice of Allowance dated Jun. 21, 2012; U.S. Appl. No. 13/271,945, filed Oct. 12, 2011; 15 pages.
Office Action dated Jul. 23, 2012; U.S. Appl. No. 13/271,985, filed Oct. 12, 2011; 26 pages.
Cai, Zhijun, et al.; U.S. Appl. No. 13/774,882; Titled: "System and Method for Inter-Radio Access Technology Signal Measurement"; filed Feb. 22, 2013.
Canadian Office Action; Application No. 2,639,809; Dec. 5, 2012; 2 pages.
Notice of Allowance dated Dec. 10, 2012; U.S. Appl. No. 13/271,985, filed Oct. 12, 2011; 17 pages.
3GPP TS 25.215 V7.3.0; 3rd Generation Partnership Project; Technical Specification Group Radio Access Network; Physical Layer—Measurements (FDD); Release 7; Sep. 2007; 20 pages.
European Examination Report; Application No. 11189921.7; May 3, 2013; 7 pages.
European Examination Report; Application No. 11189922.5; May 10, 2013; 9 pages.
European Examination Report; Application No. 11189923.3; May 6, 2013; 8 pages.
Canadian Office Action; Application No. 2,639,808; Mar. 12, 2013; 3 pages.
Office Action dated Jun. 5, 2013; U.S. Appl. No. 13/774,882, filed Feb. 22, 2013; 22 pages.
Notice of Allowance dated Dec. 20, 2010, 6 pages, U.S. Appl. No. 11/868,879, filed Oct. 10, 2007.
Final Office Action dated Dec. 16, 2010, 12 pages, U.S. Appl. No. 11/869,437, filed Oct. 9, 2007.
European Communication; EP Application No. EP07120826.8; Jan. 10, 2011; 6 pg.
Notice of Allowance dated Sep. 26, 2013; U.S. Appl. No. 13/774,882, filed Feb. 22, 2013; 10 pages.

* cited by examiner

PROXIMITY OF USER EQUIPMENT TO A HOME LOCAL NETWORK

BACKGROUND

Easily transportable devices with wireless telecommunications capabilities, such as mobile telephones, personal digital assistants, handheld computers, and similar devices, will be referred to herein as user equipment (UE). A communications connection between two UEs can be referred to as a call or a session.

As telecommunications technology has evolved, more advanced equipment has been introduced that can provide services that were not possible previously. This advanced equipment might include, for example, an enhanced node B (ENB) rather than a base station or other systems and devices that are more highly evolved than the equivalent equipment in a traditional wireless telecommunications system. Such advanced or next generation equipment may be referred to herein as long-term evolution (LTE) equipment.

In traditional wireless telecommunications systems, transmission equipment in a base station transmits signals throughout a geographic region known as a cell. For LTE and other advanced equipment, the region in which a UE can gain access to a telecommunications network might be referred to by a different name, such as a hot spot. The term "cell" will be used herein to refer to any region in which a UE can gain access to a telecommunications network, regardless of the type of UE and regardless of whether the region is a traditional cell, a region served by LTE equipment such as an ENB, or some other region or location in which wireless telecommunications services are available.

Different UEs might use different types of radio access technology (RAT) to access a telecommunications network. Some UEs, which can be referred to as multi-domain UEs or multi-mode UEs, are capable of communicating using more than one RAT. Examples of RATs or of network technologies that might use different types of RATs include Code Division Multiple Access (CDMA) 2000, UTRAN (UTMS (Universal Mobile Telecommunications System) Terrestrial Radio Access Network), Global System for Mobile Communications (GSM), GSM EDGE Radio Access Network (GERAN), Generic Access Network (GAN), Wireless Fidelity (WiFi), Wireless Local Area Network (WLAN), General Packet Radio Service (GPRS), Worldwide Interoperability for Microwave Access (WiMAX), 1× Evolution-Data Optimized (1×EV-DO), High-Speed Downlink Packet Access (HSDPA), Digital Enhanced Cordless Technology (DECT), and High Rate Packet Data (HRPD). Other RATs or other network technologies based on these RATs may be familiar to one of skill in the art.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
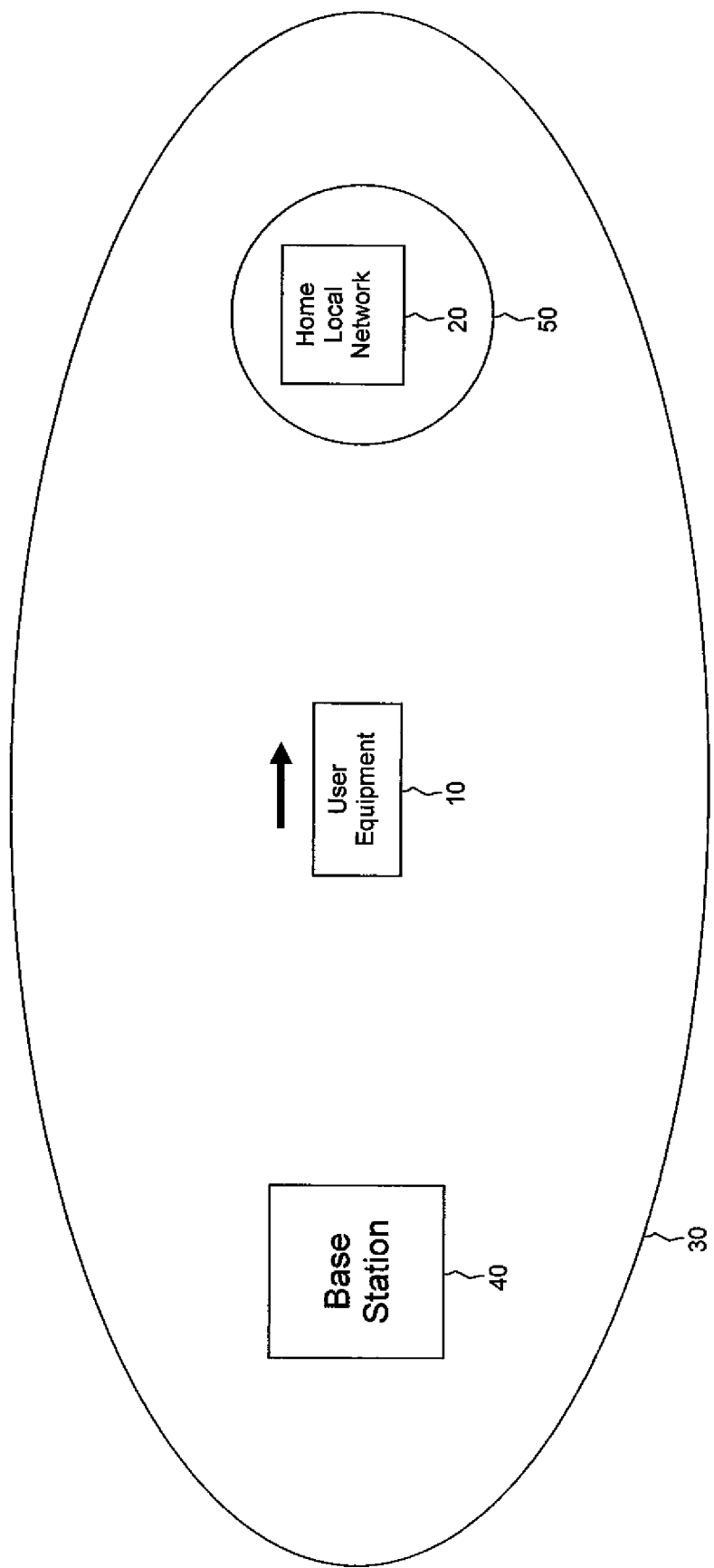
FIG. 1 is a block diagram of a telecommunications system according to an embodiment of the disclosure.

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In an embodiment, a system is provided that includes a user equipment configured to attempt a quality measure of a signal from a home local network only when the user equipment is within range of the home local network.

In another embodiment, a method is provided for determining when to measure signal quality of a home local network. The method includes determining when a user equipment is within range of the home local network. The method includes when the user equipment is within range of the home local network, measuring the signal quality from the home local network. The method includes when the user equipment is not within range of the home local network, not measuring signal quality.

In another embodiment, a system is provided that includes a processor programmed to promote determining a location of the user equipment, and based on a location of a home local network, the processor further programmed to compare the location of the user equipment with the location of the home local network and determine whether the user equipment should attempt measurement of a signal quality of the home local network.

Some UEs can engage in wireless calls or sessions via WiFi, WiMAX, WLAN, or similar high-speed, short-range wireless networks. Any such network will be referred to herein as a local network. A UE typically registers with one or more local networks in order to make use of the local networks. For example, a user of a UE might register the UE for use with a local network at the user's home, with another local network at the user's office, and with another local network at a coffee shop that the user frequents. A local network with which a UE has registered can be referred to as a home local network for that UE.

A UE might measure the quality of the signal it receives from a home local network to determine if a call in which the UE is currently engaged can be handed off to the home local network. However, since the signals transmitted by local networks typically have a relatively short range, a UE may only occasionally be near enough to a home local network to detect a signal from a home local network. A UE might waste power and computing resources if the UE were to continuously attempt to measure the quality of a signal from a home local network when the UE is out of range of the home local network and is not able to make a measurement of the signal quality. In addition, an ENB, a traditional base station, or some other component in a longer range telecommunications network would not necessarily know when a UE is near a local network and therefore could not direct a UE to measure the signal quality of a local network.

In an embodiment, one of a plurality of techniques might be used to establish when a UE is near a home local network for that UE. When a UE is near one of its home local networks, the UE can measure the signal quality of the home local network. When a UE is not near one of its home local networks, no measurements of home local network signal quality take place. As used herein the term "within range" may be used to describe whether the UE is near enough or distanced such that it is likely that the handset can take a measurement of the signal quality of the home local network. Being within range to take a measurement may include, but is not limited to, when the UE is within range or distanced to actually receive some measurable signal from the home local network. However, being within range or within range to take a measurement also includes instances where the UE should be expected to receive the signal, but no signal might be received by the UE from the home local network, or even transmitted from the home local network for various reasons, such as weather, network conditions or problems, geographical or structural obstacles or barriers, and so on. Furthermore, being within range or within range to take a measurement also includes instances where the considerations or factors evaluated indicate that the UE is near enough that it is likely that UE should be able to measure the signal quality and therefore should attempt a measurement. The UE may be said to not be in range when the considerations evaluated to determine range, as disclosed herein, indicate that the UE should not take a measurement since it is likely that the UE is not near enough to receive a measurable signal from the home local network. By not taking the measurement, handset resources may be conserved, such as battery power.

One technique that can be used to determine whether a UE is near one of its home local networks involves the use of cell identifiers, or cell IDs. As is well known in the art, cells might have unique IDs that distinguish them from other cells. In an embodiment, at the time of registration with one or more home local networks, a UE can be made aware of the IDs of cells in the serving network that overlap or are near the home local networks. It can be expected that the home local networks will be within such cells. At a later time, the UE might obtain the ID of the cell with which it is currently in communication. The UE can then compare the ID of the cell with which it is currently in communication with the IDs of cells in the serving network that overlap or are near the home local networks and thereby determine if it is currently in one of those cells. If the UE discovers that it is in such a cell, it can assume that it is near enough to the home local network to warrant attempting a measurement of the quality of the signal from the home local network.

Another technique that can be used to determine whether a UE is within range of one of its home local networks involves the use of a positioning technology such as a global positioning system (GPS). Some UEs have positioning capabilities that allow the UEs to determine their current geographic location. A positioning-capable UE might be provided with information on the physical locations of its home local networks. Such a UE might also use its positioning capabilities to learn its current physical location. The UE can then determine if its current location corresponds with the location of one of its home local networks. Two locations can be said to correspond if they are within a predefined distance of one another. In this way, the UE can determine if it is near enough to one of its home local networks to warrant attempting a measurement of the quality of the signal from the home local network.

Yet another technique for establishing that a UE is in the proximity of one of its home local networks entails a manual action on the part of the user of the UE. That is, when the user moves within range of one of the home local networks, the user can perform an action that allows or causes the UE to begin measuring the signal quality of the home local network. For example, when the user arrives at his or her home, the user might press a button, select an icon, select a menu item, activate a switch, or perform some other action on the UE that informs the UE that the UE is near a home local network and that a measurement of signal quality can be made.

Still another technique that might be used to determine whether a UE is near one of its home local networks involves the use of a server computer or other network component that is associated with a home local network. For example, a WiFi information server that provides media independent handover (MIH) services, or a similar component, might be capable of communicating with WiFi equipment in a home local network. Such a component might be aware of the physical locations of a user's home local networks and might also be aware of, or be able to ascertain, the cell in which the UE is currently located. A UE might query such a component to determine if a signal quality measurement should be made. The component might then determine whether the UE is located in one of its home local networks and, if so, might cause or allow a signal quality measurement to be made.

FIG. 1 illustrates an embodiment of a situation in which a determination might be made of the proximity of a UE 10 to a home local network 20. The UE 10 is within a large cell 30 served by a traditional base station 40, an ENB, or a similar component, and is engaged in a call via the base station 40. The UE 10 is moving toward the home local network 20, which serves a small cell 50 within the large cell 30. When the UE 10 is a large distance from the small cell 50, the UE 10 might not be able to detect a signal from the home local network 20, and therefore any attempt to measure the quality of such a signal might be a waste of resources. As the UE approaches the small cell 50, the quality of a signal from the home local network 20 might increase, and it may become desirable to hand the call off from the base station 40 to the home local network 20. For example, a call made via the home local network 20 might be less expensive than a call made via the base station 40. In such cases, it may be worthwhile to begin measuring the quality of the signal from the home local network 20 to determine if that signal is sufficient to allow a handoff from the base station 40 to the home local network 20.

In an embodiment, any of the above described techniques, or any combination of those techniques, might be used to establish whether the UE 10 is near enough to the home local network 20 to make a measurement of the quality of the signal from the home local network 20 worthwhile. If it is established that the UE 10 is near enough to the home local network 20, a measurement of the signal quality might be made using any number of well known techniques. If the signal quality from the home local network 20 is, for example, sufficiently greater than that from the base station 40, a handoff might be made from the base station 40 to the home local network 20. A number of factors may be used to determine whether to switch or handoff between networks, such as signal quality and cost.

The home local network 20 might use WiFi, WiMAX, WLAN, or some other high-speed, short-range radio access technology. In an embodiment, when the UE 10 registers with the home local network 20, the UE 10 is made aware of the radio access technology used by the home local network 20.

The UE 10 can thus make radio signal quality measurements appropriate to the type of radio access technology used by the home local network 20.

Figure 2:
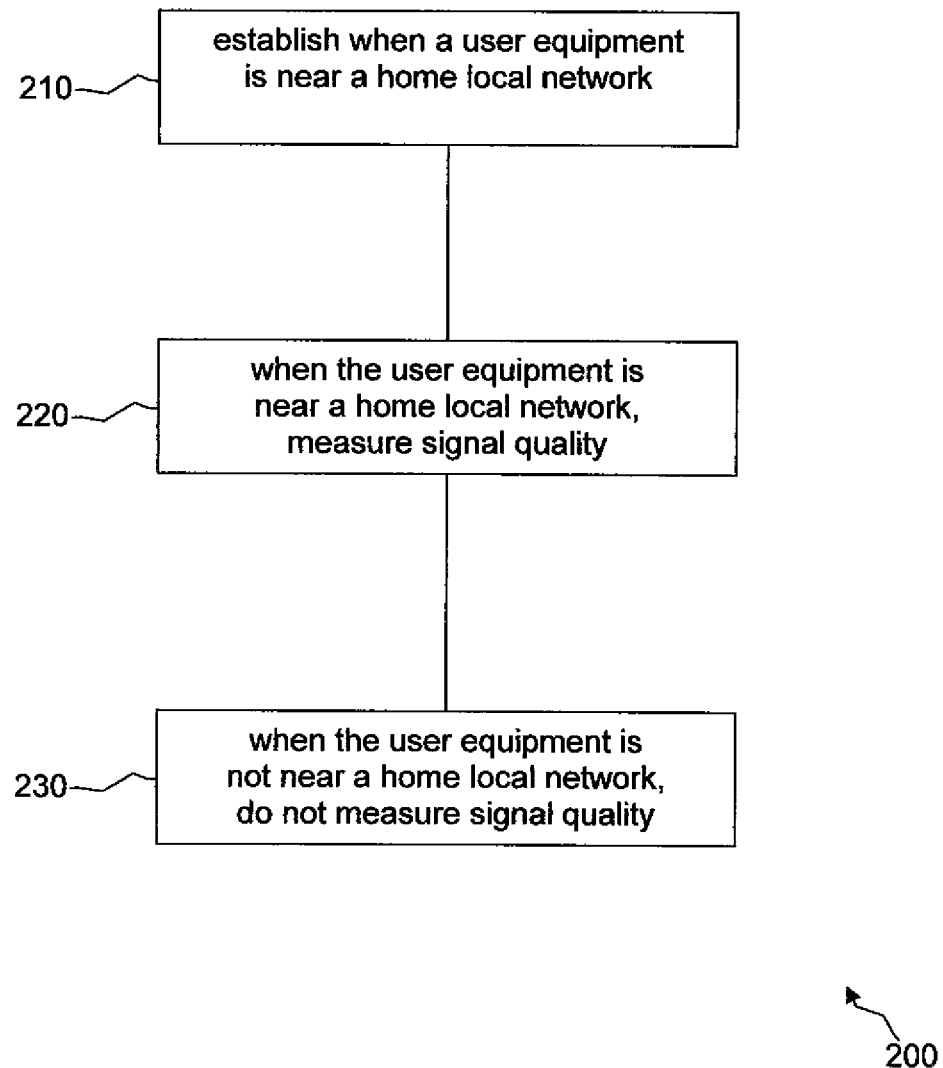
FIG. 2 is a diagram of a method for determining when a measurement of signal quality from a home local network is to be made according to an embodiment of the disclosure.

FIG. 2 illustrates an embodiment of a method 200 for determining when a measurement of signal quality from a home local network is to be made. At block 210, it is established whether a user equipment is near a home local network. At block 220, when the user equipment is near a home local network, a measurement of the signal quality from that home local network is made. At block 230, when the user equipment is not near a home local network, a measurement of signal quality is not made.

Figure 3:
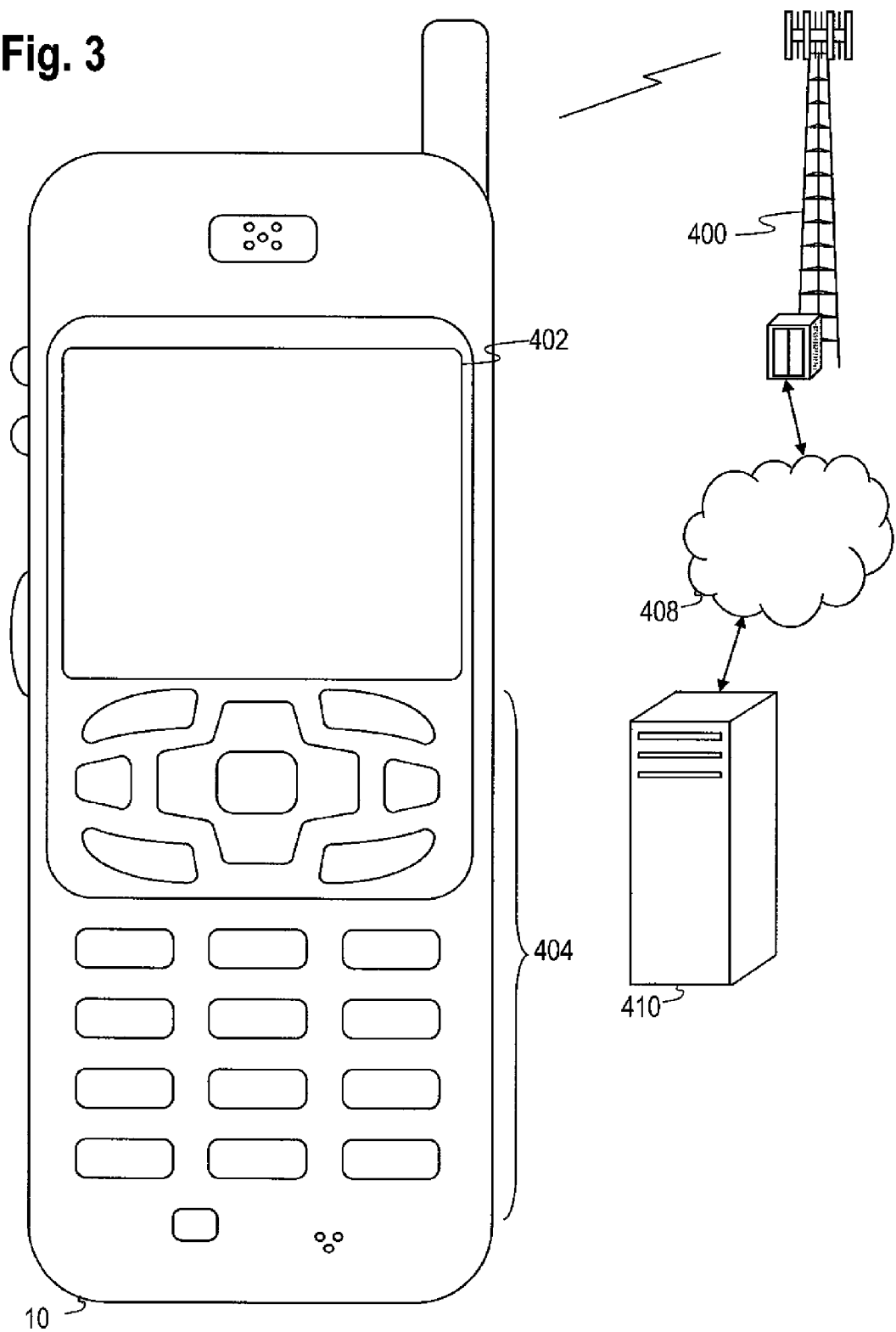
FIG. 3 is a diagram of a wireless communications system including a user equipment operable for some of the various embodiments of the disclosure.

FIG. 3 illustrates a wireless communications system including an embodiment of the UE 10. The UE 10 is operable for implementing aspects of the disclosure, but the disclosure should not be limited to these implementations. Though illustrated as a mobile phone, the UE 10 may take various forms including a wireless handset, a pager, a personal digital assistant (PDA), a portable computer, a tablet computer, or a laptop computer. Many suitable devices combine some or all of these functions. In some embodiments of the disclosure, the UE 10 is not a general purpose computing device like a portable, laptop or tablet computer, but rather is a special-purpose communications device such as a mobile phone, a wireless handset, a pager, a PDA, or a telecommunications device installed in a vehicle. In another embodiment, the UE 10 may be a portable, laptop or other computing device. The UE 10 may support specialized activities such as gaming, inventory control, job control, and/or task management functions, and so on.

The UE 10 includes a display 402. The UE 10 also includes a touch-sensitive surface, a keyboard or other input keys generally referred as 404 for input by a user. The keyboard may be a full or reduced alphanumeric keyboard such as QWERTY, Dvorak, AZERTY, and sequential types, or a traditional numeric keypad with alphabet letters associated with a telephone keypad. The input keys may include a trackwheel, an exit or escape key, a trackball, and other navigational or functional keys, which may be inwardly depressed to provide further input function. The UE 10 may present options for the user to select, controls for the user to actuate, and/or cursors or other indicators for the user to direct.

The UE 10 may further accept data entry from the user, including numbers to dial or various parameter values for configuring the operation of the UE 10. The UE 10 may further execute one or more software or firmware applications in response to user commands. These applications may configure the UE 10 to perform various customized functions in response to user interaction. Additionally, the UE 10 may be programmed and/or configured over-the-air, for example from a wireless base station, a wireless access point, or a peer UE 10.

Among the various applications executable by the UE 10 are a web browser, which enables the display 402 to show a web page. The web page may be obtained via wireless communications with a wireless network access node, a cell tower, a peer UE 10, or any other wireless communication network or system 400. The network 400 is coupled to a wired network 408, such as the Internet. Via the wireless link and the wired network, the UE 10 has access to information on various servers, such as a server 410. The server 410 may provide content that may be shown on the display 402. Alternately, the UE 10 may access the network 400 through a peer UE 10 acting as an intermediary, in a relay type or hop type of connection.

Figure 4:
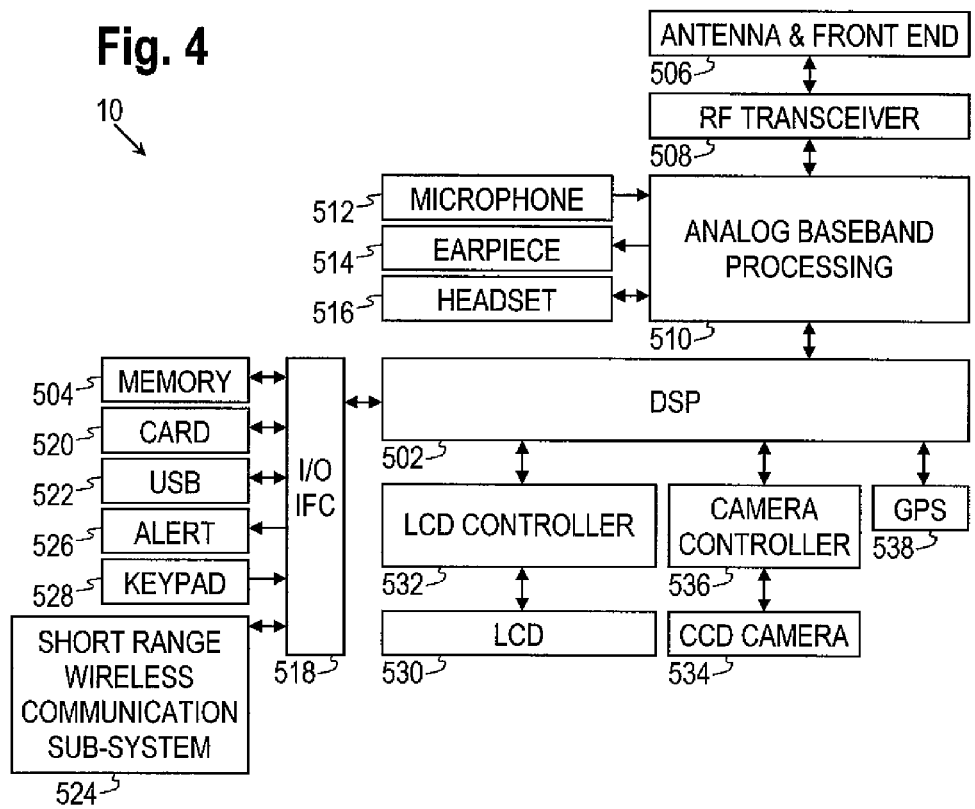
FIG. 4 is a block diagram of a user equipment operable for some of the various embodiments of the disclosure.

FIG. 4 shows a block diagram of the UE 10. While a variety of known components of UEs 10 are depicted, in an embodiment a subset of the listed components and/or additional components not listed may be included in the UE 10. The UE 10 includes a digital signal processor (DSP) 502 and a memory 504. As shown, the UE 10 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, a short range wireless communication sub-system 524, an alert 526, a keypad 528, a liquid crystal display (LCD), which may include a touch sensitive surface 530, an LCD controller 532, a charge-coupled device (CCD) camera 534, a camera controller 536, and a global positioning system (GPS) sensor 538. In an embodiment, the UE 10 may include another kind of display that does not provide a touch sensitive screen. In an embodiment, the DSP 502 may communicate directly with the memory 504 without passing through the input/output interface 518.

The DSP 502 or some other form of controller or central processing unit operates to control the various components of the UE 10 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the UE 10 to send and receive information from a cellular network or some other available wireless communications network or from a peer UE 10. In an embodiment, the antenna and front end unit 506 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 506 may include antenna tuning and/or impedance matching components, RF power amplifiers, and/or low noise amplifiers.

The RF transceiver 508 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 510 and/or the DSP 502 or other central processing unit. In some embodiments, the RF Transceiver 508, portions of the Antenna and Front End 506, and the analog baseband processing unit 510 may be combined in one or more processing units and/or application specific integrated circuits (ASICs).

The analog baseband processing unit 510 may provide various analog processing of inputs and outputs, for example analog processing of inputs from the microphone 512 and the headset 516 and outputs to the earpiece 514 and the headset 516. To that end, the analog baseband processing unit 510 may have ports for connecting to the built-in microphone 512 and the earpiece speaker 514 that enable the UE 10 to be used as a cell phone. The analog baseband processing unit 510 may further include a port for connecting to a headset or other hands-free microphone and speaker configuration. The analog baseband processing unit 510 may provide digital-to-analog conversion in one signal direction and analog-to-digital conversion in the opposing signal direction. In some embodiments, at least some of the functionality of the analog baseband processing unit 510 may be provided by digital processing components, for example by the DSP 502 or by other central processing units.

The DSP 502 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 502 may perform modulation, coding, interleaving, and spreading, and for a receiver function the DSP 502 may perform despreading, deinterleaving, decoding, and demodulation. In another embodiment, for example in an orthogonal frequency division multiplex access (OFDMA) technology application, for the transmitter function the DSP 502 may perform modulation, coding, interleaving, inverse fast Fourier transforming, and cyclic prefix appending, and for a receiver function the DSP 502 may perform cyclic prefix removal, fast Fourier transforming, deinterleaving, decoding, and demodulation. In other wireless technology applications, yet other signal processing functions and combinations of signal processing functions may be performed by the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB interface 522 and the short range wireless communication sub-system 524. The USB interface 522 may be used to charge the UE 10 and may also enable the UE 10 to function as a peripheral device to exchange information with a personal computer or other computer system. The short range wireless communication sub-system 524 may include an infrared port, a Bluetooth interface, an IEEE 802.11 compliant wireless interface, or any other short range wireless communication sub-system, which may enable the UE 10 to communicate wirelessly with other nearby mobile devices and/or wireless base stations.

The input/output interface 518 may further connect the DSP 502 to the alert 526 that, when triggered, causes the UE 10 to provide a notice to the user, for example, by ringing, playing a melody, or vibrating. The alert 526 may serve as a mechanism for alerting the user to any of various events such as an incoming call, a new text message, and an appointment reminder by silently vibrating, or by playing a specific pre-assigned melody for a particular caller.

The keypad 528 couples to the DSP 502 via the interface 518 to provide one mechanism for the user to make selections, enter information, and otherwise provide input to the UE 10. The keyboard 528 may be a full or reduced alphanumeric keyboard such as QWERTY, Dvorak, AZERTY and sequential types, or a traditional numeric keypad with alphabet letters associated with a telephone keypad. The input keys may include a trackwheel, an exit or escape key, a trackball, and other navigational or functional keys, which may be inwardly depressed to provide further input function. Another input mechanism may be the LCD 530, which may include touch screen capability and also display text and/or graphics to the user. The LCD controller 532 couples the DSP 502 to the LCD 530.

The CCD camera 534, if equipped, enables the UE 10 to take digital pictures. The DSP 502 communicates with the CCD camera 534 via the camera controller 536. In another embodiment, a camera operating according to a technology other than Charge Coupled Device cameras may be employed. The GPS sensor 538 is coupled to the DSP 502 to decode global positioning system signals, thereby enabling the UE 10 to determine its position. Various other peripherals may also be included to provide additional functions, e.g., radio and television reception.

Figure 5:
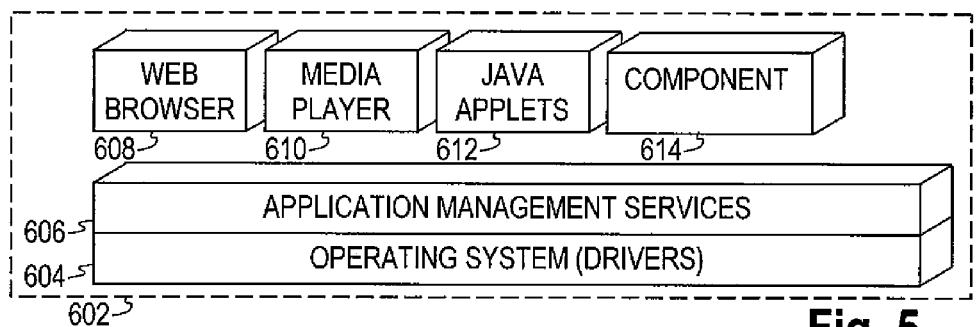
FIG. 5 is a diagram of a software environment that may be implemented on a user equipment operable for some of the various embodiments of the disclosure.

FIG. 5 illustrates a software environment 602 that may be implemented by the DSP 502. The DSP 502 executes operating system drivers 604 that provide a platform from which the rest of the software operates. The operating system drivers 604 provide drivers for the wireless device hardware with standardized interfaces that are accessible to application software. The operating system drivers 604 include application management services ("AMS") 606 that transfer control between applications running on the UE 10. Also shown in FIG. 5 are a web browser application 608, a media player application 610, and Java applets 612. The web browser application 608 configures the UE 10 to operate as a web browser, allowing a user to enter information into forms and select links to retrieve and view web pages. The media player application 610 configures the UE 10 to retrieve and play audio or audiovisual media. The Java applets 612 configure the UE 10 to provide games, utilities, and other functionality. A component 614 might provide functionality related to measurement of radio signals.

Figure 6:
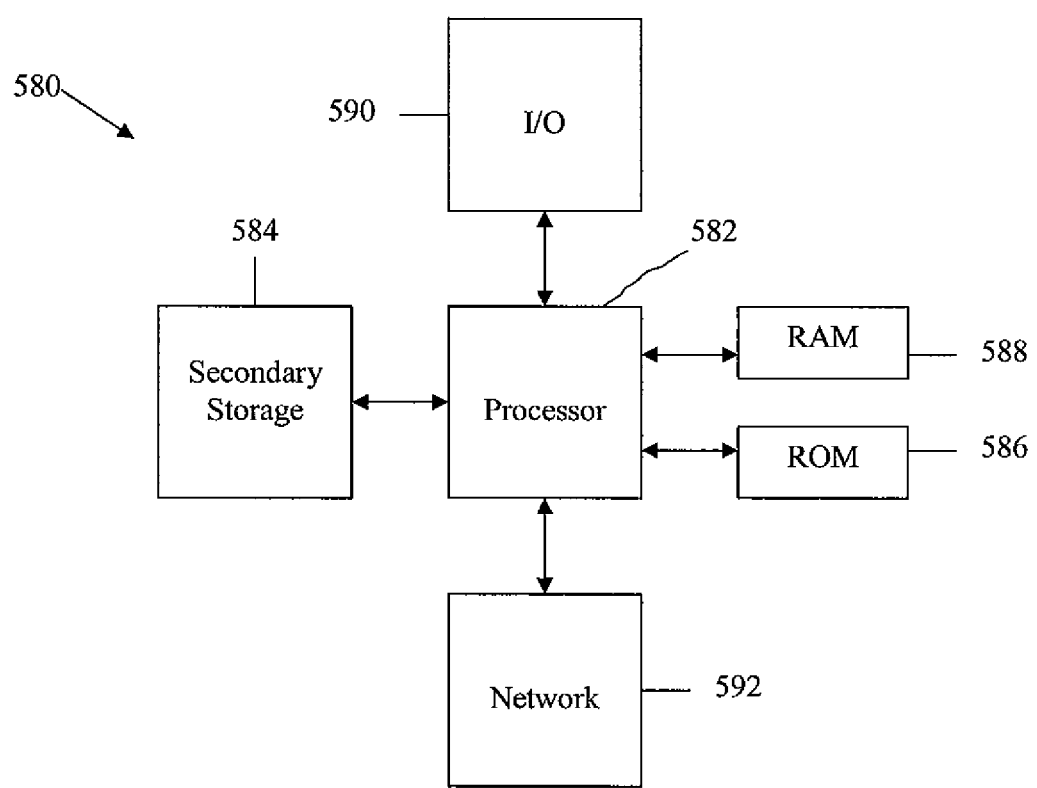
FIG. 6 is an exemplary system operable for several of the disclosed embodiments.

The system described above may be implemented on any general-purpose computer with sufficient processing power, memory resources, and network throughput capability to handle the necessary workload placed upon it. FIG. 6 illustrates a typical, general-purpose computer system suitable for implementing one or more embodiments disclosed herein. The computer system 580 includes a processor 582 (which may be referred to as a central processor unit or CPU) that is in communication with memory devices including secondary storage 584, read only memory (ROM) 586, random access memory (RAM) 588, input/output (I/O) devices 590, and network connectivity devices 592. The processor may be implemented as one or more CPU chips.

The secondary storage 584 is typically comprised of one or more disk drives or tape drives and is used for non-volatile storage of data and as an over-flow data storage device if RAM 588 is not large enough to hold all working data. Secondary storage 584 may be used to store programs which are loaded into RAM 588 when such programs are selected for execution. The ROM 586 is used to store instructions and perhaps data which are read during program execution. ROM 586 is a non-volatile memory device which typically has a small memory capacity relative to the larger memory capacity of secondary storage. The RAM 588 is used to store volatile data and perhaps to store instructions. Access to both ROM 586 and RAM 588 is typically faster than to secondary storage 584.

I/O devices 590 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 592 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity devices 592 may enable the processor 582 to communicate with an Internet or one or more intranets. With such a network connection, it is contemplated that the processor 582 might receive information from the network, or might output information to the network in the course of performing the above-described method steps. Such information, which is often represented as a sequence of instructions to be executed using processor 582, may be received from and outputted to the network, for example, in the form of a computer data signal embodied in a carrier wave. The network connectivity devices 592 may also include one or more transmitter and receivers for wirelessly or otherwise transmitting and receiving signal as are well know to one of ordinary skill in the art.

Such information, which may include data or instructions to be executed using processor 582 for example, may be received from and outputted to the network, for example, in the form of a computer data baseband signal or signal embodied in a carrier wave. The baseband signal or signal embodied in the carrier wave generated by the network connectivity devices 592 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 582 executes instructions, codes, computer programs, scripts which it accesses from hard disk, floppy disk, optical disk (these various disk based systems may all be considered secondary storage 584), ROM 586, RAM 588, or the network connectivity devices 592.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A system comprising:
a user equipment registered with a home Enhanced Node B, wherein the user is configured to transmit a first signal to a telecommunications network component associated with the home Enhanced Node B, wherein the first signal includes a query to determine if a signal quality measurement should be made,
wherein the user equipment is further configured to receive a second signal transmitted from the telecommunications network component in response to the first signal, the second signal being configured to allow the user equipment to perform a measurement of a signal quality from the home Enhanced Node B,
wherein the user equipment is further configured to perform the measurement after receiving the second signal, and
wherein the user equipment is configured to perform the signal quality measurement only when the user equipment is within range of the home Enhanced B, and the user equipment is further configured to perform at least one of:
a comparison of one or more known identifiers of one or more cells, the home Enhanced Node B within at least one of the one or more cells, with an identifier of a current cell with which the user equipment is communicating, the comparison establishing whether the user equipment is within range of the home Enhanced Node B and whether the user equipment should attempt measurement of the signal quality of the home Enhanced Node B;
a comparison of a first location of the home Enhanced Node B with a first location of the user equipment, as determined by positioning capability of the user equipment, the comparison establishing that the user equipment is within range of the home Enhanced Node B based on the first location of the home Enhanced Node B and the first location of the user equipment; or
using an input received by the user equipment to inform the user equipment that the user equipment is within range of the home Enhanced Node B.

2. The system of claim 1, wherein the input is one of:
pressing a button on the user equipment;
selecting an icon on the user equipment;
selecting a menu item on the user equipment; and
activating a switch on the user equipment.

3. The system of claim 1, wherein the second signal is transmitted from the network component, based upon a determination, by the network component, that the user equipment is located within the home Enhanced Node B.

4. A method for determining when to attempt a signal quality measurement of a home Enhanced Node B, the method comprising:
transmitting, by a user equipment registered with the Enhanced Node B, a first signal to a telecommunications network component associated with the home Enhanced Node B;
receiving, by the user equipment, a second signal from the telecommunications network component in response to the first signal, the second signal being configured to allow the user equipment to perform a measurement of a signal quality from the home Enhanced Node B;

comparing, by the user equipment, the locations of the user equipment and the home Enhanced Node B, wherein the comparing comprises comparing one or more known identifiers of one or more cells, the home Enhanced Node B within at least one of the one or more cells, with an identifier of a current cell with which the user equipment is communicating, the comparing establishing whether the user equipment is within range of the home Enhanced Node B and whether the user equipment should attempt the measurement of the signal quality of the home Enhanced Node B; and performing, by the user equipment, the measurement after receiving the second signal.

5. The method of claim 4, wherein the comparing further comprises comparing a first physical location of the home Enhanced Node B with a first physical location of the user equipment, as determined by a global positioning system capability of the user equipment.

6. The method of claim 4, wherein the comparing further comprises receiving an input by the user equipment, the input indicating that the user equipment is within range of the home Enhanced Node B.

7. The method of claim 6, wherein the input is at least one of:
pressing a button on the user equipment;
selecting an icon on the user equipment;
selecting a menu item on the user equipment; and
activating a switch on the user equipment.

8. The method of claim 4, wherein the telecommunications network component is an information server that provides media independent handover services.

9. The method of claim 8, wherein the information server compares the first location of the home Enhanced Node B to the first location of the user equipment upon receiving a query from the user equipment.

10. The method of claim 4, wherein the second signal is transmitted from the network component, based upon a determination, by the network component, that the user equipment is located within the home Enhanced Node B.

11. The method of claim 4, wherein the first signal is a query regarding the identifier of the current cell with which the user equipment is communicating.

12. A user equipment registered with a home Enhanced Node B, the user equipment comprising:
a processor programmed to promote:
transmitting a first signal to a telecommunications network component associated with the home Enhanced Node B, wherein the first signal includes a query to determine if a signal quality measurement should be made;
receiving a second signal from the telecommunications network component in response to the first signal, the second signal being configured to allow the user equipment to perform a measurement of a signal quality from the home Enhanced Node B; and
performing the measurement after receiving the second signal,
wherein the processor is further programmed to promote, determining whether the user equipment should attempt the measurement of the signal quality of the home Enhanced Node B, wherein the determining comprises at least one of;
a comparison of one or more known identifiers of one or more cells, the home Enhanced Node B within at least of the one or more cells, with an identifier of a current cell with which the user equipment is communicating, the comparison establishing whether the user equipment is within range of the home Enhanced Node B and whether the user equipment should attempt the measurement of the signal quality of the home Enhanced Node B;
a comparison of a first location of the home Enhanced Node B with a first location of the user equipment, as determined by positioning capability of the user equipment, the comparison establishing that the user equipment is within range of the home Enhanced Node B based on the first location of the home Enhanced Node B and the first location of the user equipment; or
using an input received by the user equipment to inform the user equipment that the user equipment is within range of the home Enhanced Node B.

13. The user equipment of claim 12, wherein the second signal is transmitted from the network component, based upon a determination, by the network component, that the user equipment is located within the home Enhanced Node B.

* * * * *